(12) United States Patent
Hintzer et al.

(10) Patent No.: US 9,714,307 B2
(45) Date of Patent: Jul. 25, 2017

(54) PARTIALLY FLUORINATED POLYMERS

(71) Applicant: 3M INNOVATIVE PROPERTIES COMPANY, St. Paul, MN (US)

(72) Inventors: Klaus Hintzer, Kastl (DE); Harald Kaspar, Burgkirchen (DE); Herbert Koenigsmann, Burgkirchen (DE); Helmut Traunspurger, Julbach (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/646,451

(22) PCT Filed: Nov. 20, 2013

(86) PCT No.: PCT/US2013/070886
§ 371 (c)(1),
(2) Date: May 21, 2015

(87) PCT Pub. No.: WO2014/088804
PCT Pub. Date: Jun. 12, 2014

(65) Prior Publication Data
US 2015/0291714 A1  Oct. 15, 2015

Related U.S. Application Data

(60) Provisional application No. 61/732,966, filed on Dec. 4, 2012.

(51) Int. Cl.
*C08L 27/18* (2006.01)
*C08F 214/26* (2006.01)
*C08F 214/18* (2006.01)

(52) U.S. Cl.
CPC ...... *C08F 214/262* (2013.01); *C08F 214/184* (2013.01); *C08L 27/18* (2013.01); *C08L 2201/54* (2013.01)

(58) Field of Classification Search
CPC .............. C08F 214/184; C08F 214/262; C08L 2201/54; C08L 27/18
See application file for complete search history.

(56) References Cited

U.S. PATENT DOCUMENTS

| | | | |
|---|---|---|---|
| 5,285,002 A | 2/1994 | Grootaert | |
| 5,453,477 A | 9/1995 | Oxenrider | |
| 5,804,650 A | 9/1998 | Tsuda | |
| 6,624,328 B1 | 9/2003 | Guerra | |
| 6,833,403 B1 | 12/2004 | Bladel | |
| 7,671,112 B2 | 3/2010 | Hintzer | |
| 8,598,290 B2 | 12/2013 | Kishine et al. | |
| 2007/0015865 A1 | 1/2007 | Hintzer | |
| 2008/0015319 A1 | 1/2008 | Hintzer | |
| 2008/0114118 A1 | 5/2008 | Tsuda et al. | |
| 2009/0227727 A1 | 9/2009 | Tsuda et al. | |
| 2011/0015283 A1 | 1/2011 | Tomita | |
| 2015/0291714 A1* | 10/2015 | Hintzer | C08F 214/184 524/805 |

FOREIGN PATENT DOCUMENTS

| | | |
|---|---|---|
| EP | 0779335 | 6/1997 |
| EP | 1681308 | * 7/2006 |
| EP | 1736487 | 12/2006 |
| EP | 1739099 | 1/2007 |
| EP | 1739100 | 1/2007 |
| EP | 2258675 | 12/2010 |
| JP | 2005-320500 | 11/2005 |
| RU | 2158274 | 10/2000 |
| WO | WO 96-24622 | 8/1996 |
| WO | WO 97-17381 | 5/1997 |
| WO | WO 02-088203 | 11/2002 |
| WO | WO 02-088206 | 11/2002 |
| WO | WO 02-088207 | 11/2002 |
| WO | 2008/0114118 | 1/2008 |
| WO | WO 2009-049168 | 4/2009 |
| WO | WO 2012-030784 | 3/2012 |
| WO | WO 2012-082707 | 6/2012 |
| WO | WO 2012-088258 | 6/2012 |

OTHER PUBLICATIONS

Pich, "Polymeric Particles Prepared with Fluorinated Surfmer", Polymer, 2005, vol. 46, pp. 1323-1330.
International Search Report for PCT International Application No. PCT/US2013/07886 mailed on Jan. 31, 2014, 4 pages.

* cited by examiner

*Primary Examiner* — Michael A Salvitti
(74) *Attorney, Agent, or Firm* — Julie Lapos-Kuchar

(57) ABSTRACT

A method of making a partially fluorinated polymer dispersions and resulting aqueous mixtures. The method comprising polymerizing one or more fluorinated monomers in an aqueous emulsion polymerization in the presence of a polymerizable fluorinated emulsifier to form a fluorinated polymer. The polymerizable fluorinated emulsifier has the formula $X_2C=CX(CF_2)_m(CH_2)_n[O-(CX_2)_p]_q-[O-(CX_2)_r]_s-[O-(CX_2-CX_2)]_t-[(O)_w-(CX_2)_u]_v-[CH_2]_z-Y$.

20 Claims, No Drawings

PARTIALLY FLUORINATED POLYMERS

CROSS REFERENCE TO RELATED APPLICATIONS

This application is a national stage filing under 35 U.S.C. 371 of PCT/US2013/070886, filed Nov. 20, 2013, which claims priority to U.S. Provisional Application No. 61/732,966, filed Dec. 4, 2012, the disclosure of which is incorporated by reference in their entirety herein.

TECHNICAL FIELD

A method for making partially fluorinated polymers using a polymerizable fluorinated emulsifier is described.

SUMMARY

Fluoropolymers, i.e. polymers having a fluorinated backbone, have been long known and have been used in a variety of applications because of several desirable properties such as heat resistance, chemical resistance, weatherability, UV-stability, etc.

A frequently used method for producing fluoropolymers involves aqueous emulsion polymerization of one or more fluorinated monomers using a fluorinated emulsifier. During polymerization, emulsifiers may be used to prevent coalescing of the polymer particles. After forming the polymer particles, an emulsifier may be used to stabilize the dispersion, preventing the particles from agglomerating and settling.

In some instances these emulsifiers may have a negative impact on the final product and are preferably removed. An aqueous emulsion polymerization wherein no emulsifier is used has been described in U.S. Pat. No. 5,453,477, WO 96/24622 and WO 97/17381 to generally produce homo- and copolymers of chlorotrifluoroethylene (CTFE). For example, WO 97/17381 discloses an aqueous emulsion polymerization in the absence of an emulsifier wherein a radical initiator system of a reducing agent and oxidizing agent is used to initiate the polymerization and whereby the initiator system is added in one or more further charges during the polymerization. So-called emulsifier free polymerization has further been disclosed in WO 02/88206 and WO 02/88203. In the latter PCT application, the use of dimethyl ether or methyl tertiary butyl ether is taught to minimize formation of low molecular weight fractions that may be extractable from the fluoropolymer. WO 02/88207 teaches an emulsifier free polymerization using certain chain transfer agents to minimize formation of water soluble fluorinated compounds. An emulsifier free polymerization is further disclosed in RU 2158274 for making an elastomeric copolymer of hexafluoropropylene and vinylidene fluoride. However, emulsifier free polymerizations have some disadvantages such as e.g., large particle sizes.

Thus, the aqueous emulsion polymerization process in the presence of fluorinated emulsifiers is still a desirable process to produce fluoropolymers because it can yield stable fluoropolymer particle dispersions in high yield and in a more environmental friendly way than for example polymerizations conducted in an organic solvent. Traditionally, the emulsion polymerization process is carried out using a perfluoroalkanoic acid or salt thereof as an emulsifier. These non-polymerizable emulsifiers are typically used as they provide a wide variety of desirable properties such as high speed of polymerization, good copolymerization properties of fluorinated olefins with comonomers, small particle sizes of the resulting dispersion can be achieved, good polymerization yields (i.e. a high amount of solids can be produced), good dispersion stability, etc., however, environmental concerns have been raised with these emulsifiers.

Accordingly, measures have been taken to replace the perfluoroalkanoic acid or salt thereof with alternative emulsifiers having an improved environmental profile as disclosed in U.S. Pat. Publ. No. 2007/0015865 (Hintzer et al.). However, such alternative emulsifiers can be expensive and difficult to make. Additionally, and/or alternatively, these non-polymerizable fluorinated emulsifiers may be removed from the aqueous dispersion and waste streams as disclosed in U.S. Pat. No. 6,833,403 (Blaedel, et al.). However, the removal adds an additional processing step and/or cost.

Thus, there is a desire to provide an aqueous polymerization method using a fluorinated emulsifier, which does not require removal of the fluorinated emulsifier post polymerization, and wherein the resulting aqueous emulsion is substantially free of the fluorinated emulsifier. In one embodiment, it is desirable to identify a method to manufacture partially fluorinated polymers that is simple and/or lower cost.

In one aspect, method of making a partially fluorinated polymer dispersion is described comprising: polymerizing one or more fluorinated monomers in an aqueous emulsion polymerization in the presence of a polymerizable fluorinated emulsifier to form the partially fluorinated polymer, wherein the polymerizable fluorinated emulsifier is selected from: Formula (I):

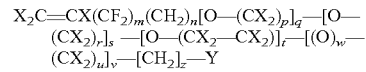

where X is independently selected from H, F, or $CF_3$; Y is COOM or $SO_3M$; m is 0-5, n is 0-5, p is at least 1, q is 0-5, r is 0-5, s is 0-5, t is 0-5, u is 0-5, v is 0-5, w is 0 or 1, and z is 0-5; wherein at least one of m, n, q, s, t, u, v, and z is at least 1; and M is H, an alkali metal, or $NH_4$; wherein the polymerizable fluorinated emulsifier (a) comprises at least 1 fluorine atom; and (b) is less than 1 wt % based on the total weight of monomers used; and wherein the partially fluorinated polymer comprises less than 50 mol % vinylidene fluoride.

In one embodiment, the polymerizable fluorinated emulsifier is selected from the group consisting of:

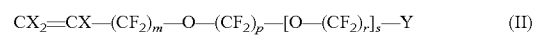

(II)

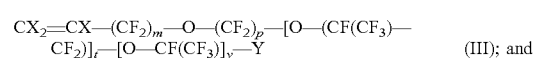

(III); and

(IV)

where X is independently selected from H, F, or $CF_3$; where Y is COOM or $SO_3M$, m is an integer selected from 0-5, p is at least 1, r is an integer selected from 0-5, s is an integer selected from 1-5, t is an integer selected from 1-5, v is an integer selected from 1-5, and M is H, an alkali metal, or $NH_4$.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The goal of the present disclosure is to prepare a partially fluorinated polymer dispersion, wherein the dispersion is stabilized and is substantially free of fluorinated emulsifier.

In the present disclosure, an acid-functionalized monomer (herein referred to as a polymerizable fluorinated emulsifier) is used, not to impart different properties onto the resulting final fluoropolymer, but to stabilize the fluoropolymer dispersion. Although not wanting to be limited by theory, it is believed that by adding a small amount of a polymerizable fluorinated emulsifier to an aqueous fluoropolymer polymerization, these acid-functionalized monomers are able to stabilize the polymerization, yet not impact the select properties of the resulting fluoropolymer. Furthermore, because the acid-functionalized monomers are polymerized into the fluoropolymer, there may be no need for removal of them from the aqueous dispersion and/or the waste water.

The present disclosure is directed toward an aqueous emulsion polymerization that comprises fluorinated monomers and a polymerizable fluorinated emulsifier. It has been found that emulsifiers of Formula (I) are effective in stabilizing the aqueous emulsion polymerization of fluoropolymers.

The polymerizable fluorinated emulsifiers of the present disclosure are those that correspond to formula (I):

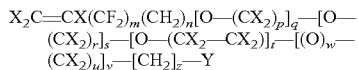

where X is independently selected from H, F, or CF$_3$; Y is COOM or SO$_3$M; wherein the polymerizable fluorinated emulsifier comprises at least 1 fluorine atom. M is H, an alkali metal (e.g., Na, Ca, etc.), or NH$_4$. Subscript m is 0-6, 0-5, 0-4; 0-3, or even 0-2. Subscript n is 0-6, 0-5, 0-4; 0-3, or even 0-2. Subscript p is at least 1, 2, 3, 4, or even 5; and no more than 20, 10, 8, or even 6. Subscript q is 0-6, 0-5, 0-4; 0-3, or even 0-2. Subscript r is 0-6, 0-5, 0-4; 0-3, or even 0-2. Subscript s is 0-6, 0-5, 0-4; 0-3, or even 0-2. Subscript t is 0-6, 0-5, 0-4; 0-3, or even 0-2. Subscript u is 0-6, 0-5, 0-4; 0-3, or even 0-2. Subscript v is 0-6, 0-5, 0-4; 0-3, or even 0-2. Subscript w is 0 or 1. Subscript z is 0-6, 0-5, 0-4; 0-3, or even 0-2. At least one of m, n, q, s, t, u, v, and z is at least 1.

The polymerizable fluorinated emulsifiers disclosed herein may be in their acid form or may be a salt, including for example, sodium, potassium, and ammonium salts.

The polymerizable emulsifier used in the present disclosure is fluorinated, therefore, the polymerizable emulsifier, must include at least 1 fluorine atom. In one embodiment, it is desirable that at least 50%, 75%, 90%, 95% or even 99% of the carbon-hydrogen bonds of the polymerizable fluorinated emulsifier be replaced by carbon-fluorine bonds. In one embodiment, the polymerizable emulsifier of the present disclosure is perfluorinated (or fully fluorinated).

In one embodiment, the polymerizable fluorinated emulsifier is selected from the group consisting of (i) fluorinated vinyl ethers, (ii) fluorinated allyl ethers, and (iii) fluorinated olefins.

In one embodiment, the polymerizable fluorinated emulsifier is a linear molecule and does not comprise any branching (e.g., a carbon substituent attached off the main chain of the molecule, e.g., CF$_2$=CF—O—CF(CF$_3$)—Y is branched).

Fluorinated vinyl ethers include those of formulas:

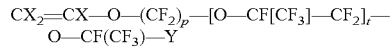

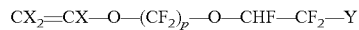

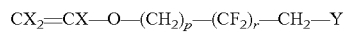

where X is independently selected from H, F, or CF$_3$; where Y is COOM or SO$_3$M. M is H, an alkali metal, or NH$_4$. Subscript r is an integer selected from at least 0 or 1 and at most 6, 5, 4, 3, or even 2. Subscript t is an integer selected from at least 0 or 1 and at most 6, 5, 4, 3, or even 2. Subscript p is an integer selected from at least 1 and at most 6, 5, 4, 3, or even 2. In one embodiment, at least one of X in the fluorinated vinyl ether comprises a H atom. In one embodiment, at least one of X in the fluorinated vinyl ether comprises a F atom.

Exemplary fluorinated vinyl ethers include partially fluorinated vinyl ethers and perfluorinated fluorinated vinyl ethers such as: CF$_2$=CF—O—(CF$_2$)$_3$—O—CF$_2$—COOM, CH$_2$=CF—O—(CF$_2$)$_3$—O—CF$_2$—COOM, CF$_2$=CF—O—(CF$_2$)$_2$—O—CF$_2$—COOM, CHF=CH—O—(CF$_2$)$_2$—O—CF$_2$—COOM, CF$_2$=CF—O—(CF$_2$)—(O—CF[CF$_3$]—CF$_2$)—O—CF(CF$_3$)—COOM, CF$_2$=CF—O—(CF$_2$)$_2$—(O—CF[CF$_3$]—CF$_2$)—O—CF(CF$_3$)—COOM, CF$_2$=CF—O—(CF$_2$)$_3$—(O—CF[CF$_3$]—CF$_2$)—O—CF(CF$_3$)—COOM, CF$_2$=CF—O—(CF$_2$)$_2$—CH$_2$—COOM, CF$_2$=CF—O—(CH$_2$)—(CF$_2$)$_2$CH$_2$—COOM, CF$_2$=CF—O—(CF$_2$)$_4$—SO$_3$M, CH$_2$=CF—O—(CF$_2$)$_4$—SO$_3$M, CHF=CH—O—(CF$_2$)$_4$—SO$_3$M, and combinations thereof where M is H, an alkali metal, or NH$_4$.

Fluorinated allyl ethers include those of formulas:

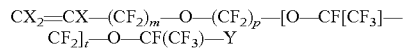

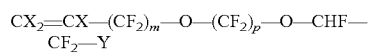

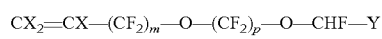

CX$_2$=CX—(CF$_2$)$_m$—O—(CF$_2$)$_p$—CH$_2$—Y and where X is independently selected from H, F, or CF$_3$ and comprises at least one F atom; where Y is COOM or SO$_3$M. M is H, an alkali metal, or NH$_4$. Subscript m is an integer selected from at least 1 and at most 6, 5, 4, 3, or even 2. Subscript r is an integer selected from at least 0 or 1 and at most 6, 5, 4, 3, or even 2. Subscript t is an integer selected from at least 0 or 1 and at most 6, 5, 4, 3, or even 2. Subscript p is an integer selected from at least 1 and at most 6, 5, 4, 3, or even 2. In one embodiment, at least one of X in the fluorinated allyl ether comprises a H atom. In one embodiment, at least one of X in the fluorinated allyl ether comprises a F atom.

Exemplary fluorinated allyl ethers include partially fluorinated allyl ethers and perfluorinated fluorinated allyl ethers such as $CF_2$=CF $CF_2$—O—$(CF_2)_3$—O—$CF_2$—COOM, $CH_2$=CF $CF_2$—O—$(CF_2)_3$—O—$CF_2$—COOM, $CF_2$=CF $CF_2$—O—$(CF_2)_2$—O—$CF_2$—COOM, CHF=CH—$CF_2$O—$(CF_2)_2$—O—$CF_2$—COOM, $CF_2$=CF $CF_2$—O—$(CF_2)$—(O—CF[$CF_3$]—$CF_2$)—O—CF($CF_3$)—COOM, $CF_2$=CF $CF_2$—O—$(CF_2)_2$—(O—CF[$CF_3$]—$CF_2$)—O—CF($CF_3$)—COOM, $CF_2$=CF $CF_2$—O—$(CF_2)_3$—(O—CF[$CF_3$]—$CF_2$)—O—CF($CF_3$)—COOM, $CF_2$=CF $CF_2$—O—$(CF_2)_2$—$CH_2$—COOM, $CF_2$=CF $CF_2$—O—$(CH_2)$—$(CF_2)_2CH_2$—COOM, $CF_2$=CF $CF_2$—O—$(CF_2)_4$—$SO_3M$, $CH_2$=CF $CF_2$—O—$(CF_2)_4$—$SO_3M$, CHF=CH $CF_2$—O—$(CF_2)_4$—$SO_3M$, and combinations thereof where M is H, an alkali metal, or $NH_4$.

Fluorinated olefins include those of formula:

$$CX_2=CX-(CF_2)_m-Y \text{ and}$$

$$CF_2=CF-(CF_2)_m-Y$$

where X is independently selected from H, F, or $CF_3$ and Y is COOM or $SO_3M$. M is H, an alkali metal, or $NH_4$. Subscript m is an integer selected from at least 1 and at most 6, 5, 4, 3, or even 2. In one embodiment, at least one of X in the fluorinated olefin comprises a H atom. In one embodiment, at least one of X in the fluorinated olefin comprises a F atom.

Exemplary fluorinated olefins include partially fluorinated olefins and perfluorinated olefins such as: $CH_2$=CF—$(CF_2)$—COOM, $CF_2$=CH—$(CF_2)$—COOM, $CH_2$=CF—$(CF_2)_2$—COOM, $CF_2$=CF—$(CF_2)$—COOM, $CF_2$=CF—$(CF_2)$—$SO_3M$, and combinations thereof where M is H, an alkali metal, or $NH_4$.

In one embodiment, the polymerizable fluorinated emulsifier is selected from the group consisting of:

$$CF_2=CF-(CF_2)_m-O-(CF_2)_p-[O-(CF_2)_r]_s-Y \quad (II)$$

$$CF_2=CF-(CF_2)_m-O-(CF_2)_p-[O-(CF(CF_3)-CF_2)]_t-[O-CF(CF_3)]_v-Y \quad (III); \text{ and}$$

$$CX_2=CX-(CF_2)_m-Y \quad (IV)$$

where X is independently selected from H, F, or $CF_3$; where Y is COOM or $SO_3M$, m is an integer selected from 0-5, p is at least 1, r is an integer selected from 0-5, s is an integer selected from 1-5, t is an integer selected from 1-5, v is an integer selected from 1-5, and M is H, an alkali metal, or $NH_4$.

Exemplary polymerizable fluorinated emulsifiers of the present disclosure include: $CF_2$=CF—O(—$CF_2$)$_p$—O—$CF_2$—COOM where p is 1, 2, 3, 4, 5, or 6; $CF_2$=CF—$CF_2$—O(—$CF_2$)$_p$—[O—$CF_2$—$(CF_2)_u$—COOM where p is 1, 2, 3, 4, 5, or 6 and u is 0 or 1; $CF_2$=CF—O—$CF_2$COOM; $CF_2$=CF—O—$(CF_2)_p$—O—CF($CF_3$)—COOM where p is 1, 2, 3, 4, 5, or 6; and $CF_2$=CF—O—$(CF_2)_p$—$SO_3M$ where p is 1, 2, 3, 4, or 5; and $CF_2$=CF—O—$(CF_2)_p$—$SO_3M$ where p is 1, 2, 3, 4, 5, or 6; and M is H, an alkali metal, or $NH_4$.

The polymerizable fluorinated emulsifiers of the present disclosure have non-telogenic activity meaning that less than 50%, 40%, 30%, 20%, 10%, 5%, 1%, or even none of the carbon bonds are to hydrogen. In other words, the polymerizable fluorinated emulsifier does not act like a chain transfer agent and consequently does not reduce the molecular weight of the resulting polymer. The polymerizable fluorinated emulsifiers of the present disclosure are polymerized into the polymer backbone and do not terminate the polymerization.

In the polymerization of the present disclosure, the polymerizable fluorinated emulsifiers mentioned above are used in the aqueous emulsion polymerization of one or more fluorinated monomers. In one embodiment, the full amount of the polymerizable fluorinated emulsifier may be added at the start of the polymerization or can be added to the polymerization in a continuous way during the polymerization. Alternatively, a portion of the polymerizable fluorinated emulsifier may be added at the start of the polymerization and the remainder added continuously or in one or separate additional portions during the polymerization. In another embodiment, the polymerization is initiated in the absence of the polymerizable emulsifier, followed by the addition of the polymerizable fluorinated emulsifier to the batch in a batch-wise or continuous manner. If polymerizable fluorinated emulsifier is added after initiation of the polymerization, preferably, the polymerizable fluorinated emulsifier is added until (or before) a conversion of monomer to polymer of 70% to 80% is achieved.

The amount of polymerizable fluorinated emulsifier used may vary depending on desired properties such as amount of solids, particle size, etc. Generally, the amount of polymerizable fluorinated emulsifier is kept to a level, which is sufficient to stabilize the fluoropolymer dispersion. Typically, the amount of polymerizable fluorinated emulsifier will be at least 50, 100, 200, 300, 400, or even 500 ppm (parts per million) and based on the total amount of monomer used. If unnecessarily large amounts of fluorinated polymerizable emulsifier are used, the resulting fluoropolymer may be difficult to coagulate and/or work-up and may also impact the properties of the final polymer, for example, thermal stability or discoloration. Typically, the amount of polymerizable fluorinated emulsifier will be at most 750, 1000, 2000, 4000, 5000, or even 10000 ppm based on the total amount of monomer used.

When doing aqueous emulsion polymerization with an emulsifier, enough emulsifier is needed to stabilize the emulsion, preventing premature coagulation of the polymer. In the present disclosure, a balance is struck between having enough polymerizable emulsifier present to stabilize the emulsion, while keeping the amount of polymerizable emulsifier used low (a) so it is incorporated into the polymer avoiding removal from the waste streams and (b) so as not to substantially impact the physical and processing properties of the resulting polymer. In the present disclosure, just enough polymerizable emulsifier is used to prevent premature coagulation during polymerization. As is known in the art, once the polymer coagulates, the polymerization stops, which can be seen during polymerization, e.g., when monomer uptake decreases by 10% in a minute and/or visually by the coagulating of the polymer, etc. The amount of polymerizable emulsifier used should be kept high enough to prevent the premature coagulation of the polymer, but low enough so that the incorporated emulsifier, does not substantially impacts the physical (e.g., tensile strength, elongation, etc.), and processing properties of the resulting polymer. Because of this balance, the amount of polymer solids generated in the polymerization of the present disclosure will be less than 30%, 29%, 28%, 27%, 26%, or even 25%; but greater than 15%, 16%, 17%, 18%, 19%, or even 20%.

The polymerization of the present disclosure is an aqueous emulsion polymerization, meaning that polymerization occurs in polymer particles dispersed in water which are electronically stabilized by an emulsifier. Aqueous emulsion polymerization can be carried out continuously in which, for example, monomers, water, optionally further emulsifiers, buffers and catalysts are fed continuously to a stirred reactor under optimum pressure and temperature conditions while the resulting emulsion is removed continuously. An alternative technique is batch or semibatch (semi-continuous) polymerization characterized by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

In one embodiment, the polymerizable fluorinated emulsifier is added continuously during the polymerization. Although not wanting to be bound by theory, it is believed that by continuously adding the polymerizable fluorinated emulsifier during polymerization, higher solids can be achieved. It is thought that because the stabilizing polar groups are covered by growing polymer chains and thus, are unable to contribute to the colloidal stability, it may be important to constantly have stabilizing polar groups at the polymer surface and thus, the polymerizable fluorinated emulsifier may be added continuously during polymerization. In one embodiment, it is preferable to stop the addition of the polymerizable fluorinated emulsifier prior to the end of the polymerization, in order to ensure that the polymerizable fluorinated emulsifier is completely incorporated into the polymer and to avoid treatment of waste water streams.

In one embodiment, it may be desirable to add a certain monomer to the polymerization in the form of an aqueous emulsion. For example, fluorinated co-monomers that are liquid under the polymerization conditions may be advantageously added in the form of an aqueous emulsion. The emulsion of such co-monomers is preferably prepared using the polymerizable fluorinated emulsifier. If a portion of the polymerizable fluorinated emulsifier is batch-charged prior to polymerization start, it is optional to use "doped" polymerizable fluorinated emulsifiers. Where the doped polymerizable fluorinated emulsifier are microemulsions with fluorinated, low telogenic, inert liquids with boiling points higher than 100° C. Examples of such liquids include: (i) fluorinated cyclic hydrocarbons, such as octafluoronaphthalene, octafluorotoluene, hexafluorobenzene, perfluoroperhydrophenantrene ($C_{14}F_{24}$), perfluoroperhydrofluorene ($C_{13}F_{22}$), perfluoro decalin ($C_{10}F_{18}$), perfluoro methyl decalin ($C_{11}F_{20}$), perfluoro butyl decalin ($C_{14}F_{26}$), perfluorodimethylcyclohexane ($C_8F_{16}$), perfluoromethylcyclohexane ($C_7F_{14}$), perfluorodimethylcyclobutane ($C_6F_{12}$); (ii) fluorinated polyoxyalkenes of the formula $CF_2=CF-(CF_2)_l-O(R^a_fO)_n(R^b_fO)_mR^c_f$ where $R^a_f$ and $R^b_f$ are different perfluoroalkylene groups of 3 to 6 C-atoms, $R_{ef}$ is a perfluoroalkyl group of 1 to 6 C-atoms, l is 0 or 1, m and n are independently 0 to 10 and n+m is >2 or >3, examples include: $CF_3-CF_2-CF_2-(O-CF(-CF_3)-CF_2)_2-O-CF=CF_2$ (PPVE-3), $CF_3-CF_2-CF_2-(O-CF(-CF_3)-CF_2)_3-O-CF=CF_2$ (PPVE-4), $CHF_2-CF_2-CF_2-(O-CF(-CF_3)-CF_2)-O-CF=CF_2$ (HPPVE-2), $CHF_2-CF_2-CF2-(O-CF(-CF_3)-CF_2)_2-O-CF=CF2$ (HPPVE-3); (iii) fluorinated alkenes of the formula $F_3C-C(R^d_f)=C(R^e_f)(R^f_f)$ where $R^d_f$ and represent $R^e_f$ independently from each other fluorine or a perfluorinated or partially fluorinated, linear or branched alkyl group, preferably a group having from 1 to 6, preferably 1 to 3, carbon atoms and $R^f_f$ represents a perfluorinated, linear or branched alkyl group of 1 to 6 carbon atoms, preferably a methyl, ethyl, propyl or isopropyl group, examples include: $C(-CF_3)(-CF_3)=CF-CF_2-CF_3$ (HFP-Dimer), and $C(-CF_3)_2=C(-CF_2-CF_3)(-CF(-CF_3)_2)$ (HFP-Trimer); and (iv) fluorinated polyoxyalkanes of the formula $R^g_f-O-R^h_f-O-R^i_f$ where $R^g_f$ and $R^i_f$ are independently fluorinated alkyl groups of 2 to 5 C-atoms and $R^h_f$ is a branched perfluorinated alkyl group of 2 to 4 C-atoms, examples include: $CHF_2-CF_2-CF_2-O-CF(-CF_3)-CF_2-O-CFH-CF_3$ (HTFEE-2), $CHF_2-CF_2-CF_2-O-CF(-CF_3)-CF(-CF_3)-O-CF_2-CF_2-CHF_2$, and $CF_3-CF_2-CF_2-O-CF(-CF_3)-CF(-CF3)-O-CF_2-CF_2-CF_3$. See for example, U.S. Pat. Publ. No. 2011/0294951 (Hintzer et al.), herein incorporated by reference.

The aqueous emulsion polymerization may be carried out at temperatures between 10 to 100° C., or even 30° C. to 80° C. and the pressure is typically between 2 and 50 bar, or even 5 to 30 bar. The reaction temperature may be varied during the polymerization to influence the molecular weight distribution, i.e., to obtain a broad molecular weight distribution or to obtain a bimodal or multimodal molecular weight distribution.

The aqueous emulsion polymerization is typically initiated by an initiator including any of the initiators known for initiating a free radical polymerization of fluorinated monomers. The initiators of the polymerization system are selected such that the polymer endgroups are the same as the polymerizable fluorinated emulsifier; e. g. $KMnO_4$ generates $COO^-$ endgroups, while APS/bisulfite systems partially generate $SO_3^-$ endgroups.

Suitable initiators include peroxides and azo compounds and redox based initiators. Specific examples of peroxide initiators include, hydrogen peroxide, sodium or barium peroxide, diacylperoxides such as diacetylperoxide, disuccinoyl peroxide, dipropionylperoxide, dibutyrylperoxide, dibenzoylperoxide, benzoylacetylperoxide, diglutaric acid peroxide and dilaurylperoxide, and further peracids and salts thereof such as e.g. ammonium, sodium or potassium salts. Examples of per-acids include peracetic acid. Esters of the peracid can be used as well and examples thereof include tert-butylperoxyacetate and tert-butylperoxypivalate. Examples of inorganic initiators include for example ammonium-alkali- or earth alkali salts of persulfates, permanganic or manganic acid. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (sold for example under the trade designation "RONGALIT") or fluoroalkyl sulfinates as disclosed in U.S. Pat. No. 5,285,002 (Grootaert). The reducing agent typically reduces the half-life time of the persulfate initiator. Additionally, a metal salt catalyst such as for example copper, iron or silver salts may be added. The amount of initiator may be between 0.01% by weight and 1% by weight based on the fluoropolymer solids to be produced. In one embodiment, the amount of initiator is between 0.05 and 0.5% by weight. In another embodiment, the amount may be between 0.05 and 0.3% by weight. The full amount of initiator may be added at the start of the polymerization or the initiator can be added to the polymerization in a continuous way during the polymerization. Preferably the initiator is added until a conversion of monomer to polymer of 70% to 80% is achieved. One can also add part of the initiator at the start and the remainder in one or separate additional portions during the polymerization.

The aqueous emulsion polymerization system may further comprise other materials, such as buffers and, if desired, complex-formers or chain-transfer agents. Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$; hydrofluorocarbon compounds such as $CH_2F-CF_3$ (R134a); alcohols; esters; and the like.

The polymers of the present disclosure are partially fluorinated and comprise at least one fluorinated monomer. Examples of fluorinated monomers that may be polymerized using the polymerizable fluorinated emulsifier as an emulsifier: include tetrafluoroethylene (TFE), chlorotrifluoroethylene (CTFE), hexafluoropropylene (HFP), dichlorodifluoroethylene, vinylidene fluoride, vinyl fluoride, pentafluoropropylene (e.g., 2-hydropentrafluoropropylene, fluoroethylene, trifluoroethylene, 1-HPFP, 2-HPFP, and perfluorinated alkyl vinyl monomers such as perfluorinated vinyl ethers (PVE) and perfluorinated allyl ethers, perfluoro-5-oxa-hept-6-ene sulphonic acid fluoride (MV4S), $CF_2=CFO(CF_2)_5CN$ (MV5CN), and combinations thereof.

Suitable perfluoroalkyl vinyl monomers correspond to the general formula: $CF_2=CF-R^d{}_f$ or $CH_2=CH-R^d{}_f$ wherein $R^d{}_f$ represents a perfluoroalkyl group of 1-10, or even 1-5 carbon atoms.

Examples of perfluorovinyl ethers that can be used in the present disclosure include those that correspond to the formula: $CF_2=CF-O-R_f$ wherein $R_f$ represents a perfluorinated aliphatic group that may contain no, one or more oxygen atoms and up to 12, 10, 8, 6 or even 4 carbon atoms. Exemplary perfluorinated vinyl ethers correspond to the formula: $CF_2=CFO(R^a{}_fO)_n(R^b{}_fO)_mR^c{}_f$ wherein $R^a{}_f$ and $R^b{}_f$ are different linear or branched perfluoroalkylene groups of 1-6 carbon atoms, in particular 2-6 carbon atoms, m and n are independently 0-10 and $R^c{}_f$ is a perfluoroalkyl group of 1-6 carbon atoms. Specific examples of perfluorinated vinyl ethers include perfluoro (methyl vinyl) ether (PMVE), perfluoro (ethyl vinyl)ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Examples of perfluoroallyl ethers that can be used in the present disclosure include those that correspond to the formula: $CF_2=CF(CF_2)-O-R_f$ wherein $R_f$ represents a perfluorinated aliphatic group that may contain no, one or more oxygen atoms and up to 10, 8, 6 or even 4 carbon atoms. Specific examples of perfluorinated allyl ethers include: $CF_2=CF_2-CF_2-O-(CF_2)F$ wherein n is an integer from 1 to 5, and $CF_2=CF_2-CF_2-O-(CF_2)_x-O-(CF_2)_y-F$ wherein x is an integer from 2 to 5 and y is an integer from 1 to 5.

In addition to the fluorinated monomer, additional monomers may be added, such as non-fluorinated olefinic monomers. Exemplary non-fluorinated olefinic monomers include: propylene, ethylene, isobutylene, and combinations thereof.

The resulting fluoropolymers of the present disclosure are partially fluorinated. As used herein, "partially fluorinated" means that the repeating monomer units of the resulting polymer comprise at least one carbon-hydrogen bond and at least one carbon-fluoride bond in the polymer backbone.

In one embodiment, the partially fluorinated elastomer comprises interpolymerized units derived from (i) hexafluoropropylene (HFP), tetrafluoroethylene (TFE), and vinylidene fluoride (VDF); (ii) hexafluoropropylene and vinylidene fluoride, (iii) vinylidene fluoride and perfluoromethyl vinyl ether, (iv) vinylidene fluoride, tetrafluoroethylene, and perfluoromethyl vinyl ether, (v) vinylidene fluoride, tetrafluoroethylene, and propylene, (vi) tetrafluoroethylene, and propylene, or (vii) ethylene, tetrafluoroethylene, and perfluoromethyl vinyl ether.

Exemplary polymers that would benefit from the methods as disclosed herein include: a TFE/propylene copolymer, a TFE/ethylene copolymer, a TFE/propylene/VDF copolymer, a VDF/HFP copolymer, a TFE/VDF/HFP copolymer, a TFE/ethylene/PMVE copolymer, a TFE/ethylene/$CF_2=CFOC_3F_7$ copolymer, a TFE/ethyl vinyl ether (EVE) copolymer, a TFE/butyl vinyl ether (BVE) copolymer, a TFE/EVE/BVE copolymer, a VDF/$CF_2=CFOC_3F_7$ copolymer, an ethylene/HFP copolymer, a TFE/ethylene/HFP copolymer, a CTFE/VDF copolymer, a TFE/VDF copolymer, a TFE/VDF/PMVE/ethylene copolymer, and a TFE/VDF/$CF_2=CFO(CF_2)_3OCF_3$ copolymer.

In one embodiment, the polymer is a TFE/VDF/HFP copolymer derived from at least 30, 35, 40, 45, 50, or even 55% weight TFE and at most 60, 65, 70, 75, 80, or even 85% by weight TFE; at least 5, 10, 15, 20, 25, or even 30% weight VDF and at most 35, 40, 45, 50 or even 55% by weight VDF; and at least 5, 10, 15, 20, 25, or even 30% weight HFP and at most 35, 40, 45, 50 or even 55% by weight HFP based on the total weight of monomers used in the polymerization.

In one embodiment, the partially fluorinated polymer of the present disclosure comprises less than 50%, 45%, 40%, 35%, 30%, 25%, 20%, 15%, 10%, 5%, 1%, 0.5%, or even 0.1% by mole of monomeric vinylidene fluoride units based on the total monomeric units of the partially fluorinated polymer. In one embodiment, the partially fluorinated polymer is substantially free of interpolymerized units of vinylidene fluoride.

In one embodiment, the resulting partially fluorinated polymer may be a fluoroplastic.

In one embodiment, the polymerization of the present disclosure is substantially free of a non-polymerizable fluorinated emulsifier (e.g. perfluoroalkanoic acids, fluorinated ethers and alkoxy ethers). In other words, less than 25 ppm, 10 ppm, 1 ppm, or even 0.1 ppm of a non-polymerizable fluorinated emulsifier is in the final latex.

The aqueous emulsion polymerization results in a dispersion of the partially fluorinated polymer in water (also known as a latex). Generally the amount of solids of the fluoropolymer in the dispersion directly resulting from the polymerization will vary between 3% by weight and about 40% by weight depending on the polymerization conditions. A typical range is between 5 and 30% by weight. The particle size (z-average particle size) of the fluoropolymer is typically between 50 nm and 350 nm with a typical particle size being between 100 nm and about 300 nm.

Because the polymerizable fluorinated emulsifier is polymerized into the partially fluorinated polymer of the present disclosure, in one embodiment, the resulting latex has a low amount or is substantially free of the polymerizable fluorinated emulsifier. In other words, less than 100 ppm, 50 ppm, 25 ppm, 10 ppm, or even 1 ppm of the polymerizable fluorinated emulsifier is in the final latex.

After polymerization, the resulting latex may be upconcentrated to increase the solid content. Non-ionic surfactants (e.g., those sold under the trade designations of "TRITON" and "GENAPOL") may be used to further upconcentrate the latex to a solid content of 40-60% as is known in the art.

Alternatively, or in addition to upconcentrating the latex, the fluoropolymer particles may be isolated from the dispersion by coagulation and dried. Such coagulation methods are known in the art and include chemical and physical methods, for example, using an electrolyte or inorganic salt (such as HCl, $H_2SO_4$, $HNO_3$, $H_3PO_4$, $Na_2SO_4$, $MgCl_2$, ammonium carbonate, etc.), using freeze-thaw cycles, applying high sheer, and/or applying ultrasonics.

In another embodiment, the process described herein may be used to generate a fully polymerized polymer particle, wherein no further polymerization is conducted on the polymer particles.

The polymerizable fluorinated emulsifiers of the present disclosure comprise at least one ionic group. During polymerization, these polymerizable fluorinated emulsifiers are incorporated into the resulting polymer and some of these groups may be accessible for quantitation. The ionic groups can be detected by techniques as is known in the art, e.g., Fourier Transform Infrared (FTIR) spectroscopy or by titration.

In the present disclosure, the polymerizable fluorinated emulsifier is used to stabilize the growing polymer during polymerization. Yet, a low level of polymerizable fluorinated emulsifier is used, so that the resulting properties of the final partially fluorinated polymer are substantially the same as those which were polymerized with a non-polymerizable fluorinated emulsifier. For example, the partially fluorinated polymer made as disclosed herein with a polymerizable fluorinated emulsifier, should be substantially the same as the same polymer made with a non-polymerizable non-telogenic fluorinated emulsifier (e.g., perfluoroalkanoic acids and their salts or fluorinated ethoxylated carboxylic acids and their salts). For example, tensile strength should be less than 20%, 18%, 15%, 12% or even 10% different, and the elongation should be less than 20%, 18%, 15%, 12% or even 10% different. Additionally, the processing properties of the partially fluorinated polymer made as disclosed herein with a polymerizable fluorinated emulsifier, should be substantially the same as the same polymer made with a non-polymerizable non-telogenic fluorinated emulsifier.

In one embodiment of the present disclosure, the resulting dried partially fluorinated polymer made by the processes disclosed herein is substantially free of a non-polymerizable fluorinated emulsifier. In other words, the partially fluorinated polymer comprises less than 10 ppm, 5 ppm, 1 ppm, 0.5 ppm, 0.1 ppm, 50 ppb (parts per billion) 10 ppb or even no non-polymerizable fluorinated emulsifier. The amount of non-polymerizable fluorinated emulsifiers in the polymer can be determined by volatizing or extracting the emulsifiers from the partially fluorinated polymer using techniques known in the art.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, mol=mole; cm=centimeter, mm=millimeter, ml=milliliter, L=liter, psi=pressure per square inch, MPa=megaPascals, and wt=weight.

Methods

Melt Flow Index

The melt flow index (MFI) of the fluoropolymers, reported in g/10 min, was measured at a temperature of 265° C. following a method similar to that described in DIN EN ISO 1133 with a support weight of 5.0 kg. The MFI was obtained with a standardized extrusion die of 2.095 mm diameter and a length of 8.0 mm.

Melting Point

Melting peaks of the fluoropolymers were determined following a method similar to that described in ASTM 4591 by means of Perkin-Elmer DSC 7.0 (Perkin-Elmer, Waltham, Mass.) under nitrogen flow and a heating rate of 10° C./min. The indicated melting points relate to the melting peak maximum.

Particle Size Determination

The latex particle size determination was conducted by means of dynamic light scattering (Malvern Zetazizer 1000 HAS, Malvern, UK) following a method similar to that described in ISO/DIS 13321. The reported average particle size is the z-average. Prior to the measurements, the polymer latexes as yielded from the polymerisations were diluted with 0.001 mol/L KCl-solution, the measurement temperature was 20° C. in all cases.

Polymerizable Fluorinated Emulsifier Determination

A $BF_3$ methanol complex was used to derivatize the $CF_2$=CF—O—$(CF_2)_3$—O—$CF_2$—$COO^-$ molecule in the polymer to its methylester form. The content of the polymerizable fluorinated emulsifier in the polymer sample was determined by headspace gas chromatography with a mass spectrometer detection. A fused silica capillary column having an inner diameter of 0.32 mm coated with a 1% vinyl/5% phenyl/94% dimethyl polysiloxane (1.8 μm film thickness) was used. The results are reported as the methyl ester form.

Comparative Example A

The polymerization experiment was performed in a 50-L kettle equipped with an impeller agitator and a baffle. 30 L deionized water containing 12 g ammonium oxalate, and 2 g oxalic acid were fed into the kettle. Air was removed from the kettle by alternating evacuation and pressurizing with nitrogen up to 4 bar. After evacuating the air, the kettle was pressurized with 8.3 bar HFP, 2.3 bar VDF, 1.1 bar TFE, and 0.4 bar ethane (chain transfer agent), resulting in a total pressure is 15.5 bar abs. The temperature in the kettle was adjusted to 60° C. Polymerization was initiated by pumping an aqueous solution containing 0.15 g Potassium permanganate dissolved in 30 ml deionized water into the kettle. The speed of agitation was 240 rpm. Polymerization temperature and pressure were kept constant by feeding TFE, HFP and VDF in a constant ratio of 1:0.335:0.379 and feeding a solution of 5 g potassium permanganate in 1 L deionized water at a rate of 0.15 kg/hr.

When 2.0 kg TFE was consumed, the polymerization was stopped due to declining TFE uptake. The vessel was then vented and the resulting dispersion discharged. The thus obtained dispersion has a solid content of 9.7% and an average particle size of 302 nm. The MFI (265° C./5 kg) was 60 g/10 min.

Comparative Example B

The same set-up and similar conditions as described in Comparative Example A was used with the following exception, the 30 L of deionized water contained 23 g of a non-polymerizable fluorinated emulsifier ([CF$_3$—O—(CF$_2$)$_3$—O—CHF—CF$_2$—C(O)O$^-$NH$_4^{+}$, prepared as described in U.S. Pat. No. 7,671,112 Hintzer, et al.), along with 12 g ammonium oxalate, and 2 g oxalic acid.

When 4.5 kg TFE was consumed, polymerization was stopped by no longer feeding in the monomers and lowering the speed of agitation. The vessel was vented and the resulting dispersion was discharged. The thus obtained dispersion has a solid content of 19.6% and particle size of 198 nm. The MFI(265° C./5kg) was 40 g/10 min.

Example 1

The same set-up and similar conditions as described in Comparative Example A was used with the following exception, the 30 L of deionized water contained 7.3 g of a polymerizable fluorinated emulsifier of CF$_2$=CF—O—(CF$_2$)$_3$—O—CF$_2$—COO$^-$Na$^+$ (which was received as in its methylester form from Anles/St. Petersburg, Russia and converted in-house to the sodium salt form) along with 12 g ammonium oxalate, and 2 g oxalic acid.

When 4.5 kg TFE was consumed, polymerization was stopped by no longer feeding in the monomers and lowering the speed of agitation. The vessel was vented and the resulting dispersion was discharged. The thus obtained dispersion has a solid content of 20.4% and an average particle size of 116 nm. The MFI at 265° C./5 kg was 50 g/10 min. No polymerizable fluorinated emulsifier could be detected in the resulting latex indicating that the polymerizable fluorinated emulsifier was incorporated into the polymer.

Example 2

The same set-up and similar conditions as described in Comparative Example A was used with the following exception, the 30 L of deionized water contained 6.9 g of a polymerizable fluorinated emulsifier of CF$_2$=CF—O—(CF$_2$)$_4$—SO$_2$O$^-$NH$_4^+$ (prepared from CF$_2$=CF—O—(CF$_2$)$_4$ SO$_2$F as disclosed in U.S. Pat. No. 6,624,328 (Guerra) and converted to the ammonium salt form) along with 12 g ammonium oxalate, and 2 g oxalic acid.

When 4.5 kg TFE was consumed, polymerization was stopped by no longer feeding in the monomers and lowering the speed of agitation. The vessel was vented and the resulting dispersion was discharged. The thus obtained dispersion has a solid content of 19.8% and an average particle size of 124 nm. The MFI at 265° C./5 kg was 57 g/10 min.

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosures incorporated by reference herein, this specification will control.

What is claimed is:

1. A method of making a partially fluorinated polymer dispersion comprising:

polymerizing vinylidene fluoride, tetrafluoroethylene, and hexafluoropropylene in an aqueous emulsion polymerization in the presence of a polymerizable fluorinated emulsifier to form the partially fluorinated polymer, wherein the polymerizable fluorinated emulsifier has the formula:

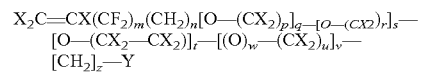

where X is independently selected from H, F, or CF$_3$; Y is COOM or SO$_3$M where M is H, an alkali metal or NH$_4$; m is 0 to 5, n is 0 to 5, p is at least 1, q is 0 to 5, r is 0 to 5, s is 0 to 5, t is 0 to 5, u is 0 to 5, v is 0 to 5, w is 0 or 1, and z is 0 to 5; wherein at least one of m, n, q, s, t, u, v, and z is at least 1; wherein the polymerizable fluorinated emulsifier (a) comprises at least 1 fluorine atom; and (b) is less than 1 wt % based on the total weight of monomers used; and wherein the partially fluorinated polymer comprises less than 30% by weight of vinylidene fluoride, at most 60% by weight of tetrafluoroethylene, and at most 55% by weight of hexafluoropropylene based on the total weight of the partially fluorinated polymers.

2. The method of claim 1, wherein the polymerizable fluorinated emulsifier is perfluorinated.

3. The method of claim 1, wherein the polymerizable fluorinated emulsifier is substantially free of telogenic activity.

4. The method of claim 1, wherein the polymerizable fluorinated emulsifier is selected from the group consisting of:

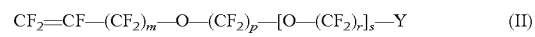

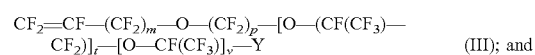

where X is independently selected from H, F, or CF$_3$; where Y is COOM or SO$_3$M, where m is an integer selected from 0 to 5, p is at least 1, r is an integer selected from 0 to 5, s is an integer selected from 1 to 5, t is an integer selected from 1 to 5, v is an integer selected from 1 to 5, and M is H, an alkali metal, or NH$_4$.

5. The method of claim 1, wherein the polymerization is substantially free of a non-telogenic emulsifier.

6. The method of claim 1, wherein the polymerization is substantially free of a non-telogenic fluorinated emulsifier.

7. The method of claim 1, wherein the polymerizable fluorinated emulsifier is added throughout the polymerization.

8. The method of claim 1, wherein the amount of polymerizable fluorinated emulsifier is at least 50 ppm and no more than 5,000 ppm based on the amount of perfluorinated monomer used.

9. The method of claim 1, wherein the polymerizable fluorinated emulsifier is provided in the form of an aqueous microemulsion.

10. The method of claim 1, wherein the partially fluorinated polymer dispersion comprises less than 30% polymer solids.

11. An aqueous mixture comprising:
    a partially fluorinated polymerization product of vinylidene fluoride, tetrafluoroethylene, and hexafluoropropylene and a polymerizable fluorinated emulsifier selected from:

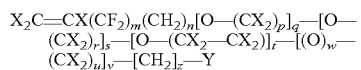

where X is independently selected from H, F, or $CF_3$; Y is COOM or $SO_3M$; m is 0 to 5, n is 0 to 5, p is at least 1, q is 0 to 5, r is 0 to 5, s is 0 to 5, t is 0 to 5, u is 0 to 5, v is 0 to 5, w is 0 or 1, and z is 0 to 5; wherein at least one of m, n, q, s, t, u, v, and z is at least 1; and M is H, an alkali metal, or $NH_4$; wherein the resulting polymer comprises less than 30% by weight of vinylidene fluoride, at most 60% by weight of tetrafluoroethylene, and at most 55% by weight of hexafluoropropylene based on the total weight of the partially fluorinated polymer; and wherein the aqueous mixture comprises less than 100 ppm of the polymerizable fluorinated emulisifier.

12. The aqueous mixture of claim 11 wherein the aqueous mixture comprises less than 30% polymer solids.

13. The method of claim 1 wherein at least one of X is H.

14. The method of claim 1 wherein the partially fluorinated polymer dispersion comprises less than 100 ppm of the polymerizable fluorinated emulsifier.

15. The method of claim 1 wherein the partially fluorinated polymer dispersion comprises less than 10 ppm of the polymerizable fluorinated emulsifier.

16. The method of claim 1 wherein the partially fluorinated polymer dispersion comprises less than 1 ppm of the polymerizable fluorinated emulsifier.

17. The method of claim 1 wherein the partially fluorinated polymer is a fluoroplastic.

18. The method of claim 1, wherein the partially fluorinated polymer further comprises polymerized monomers selected from: perfluoroalkoxy alkenes, perfluoro alkyl vinyl ethers, perfluoroalkoxy vinyl ethers, ethylene, propylene, and combinations thereof.

19. The method of claim 1, wherein the polymerizable fluorinated emulsifier is selected from: (a) $F_2C{=}CF{-}O{-}(CF_2)_p{-}O{-}CF_2{-}COOM$ where p is 1, 2, 3, 4, 5, or 6; or (b) $F_2C{=}CFCF_2{-}O{-}(CF_2)_p{-}O{-}CF_2{-}(CF_2)_u]_v{-}COOM$ where p is 1, 2, 3, 4, 5, or 6 and u is 0 or 1.

20. The method of claim 1, wherein the partially fluorinated polymer comprises at least 30% by weight of tetrafluoroethylene, at least 5% by weight of hexafluoropropylene, and at least 5% by weight of vinylidene fluoride based on the total weight of the partially fluorinated polymer.

* * * * *

UNITED STATES PATENT AND TRADEMARK OFFICE
CERTIFICATE OF CORRECTION

PATENT NO. : 9,714,307 B2
APPLICATION NO. : 14/646451
DATED : July 25, 2017
INVENTOR(S) : Klaus Hintzer et al.

It is certified that error appears in the above-identified patent and that said Letters Patent is hereby corrected as shown below:

In the Specification

Column 7,
Lines 49 & 50, delete "perfluoroperhydrophenantrene" and insert
-- perfluoroperhydrophenanthrene --, therefor.
Line 57, delete "$R_{ef}$" and insert -- $R^c_f$ --, therefor.

Column 8,
Line 41, delete "peracids" and insert -- per-acids --, therefor.

Column 9,
Line 56, delete "$(CF_2)F$" and insert -- $(CF_2)_nF$ --, therefor.

Column 12,
Line 27, delete "Zetazizer" and insert -- Zetasizer --, therefor.

Column 13,
Line 19, delete "MFI(265° C./5kg)" and insert -- MFI (265° C./5kg) --, therefor.

In the Claims

Column 14,
Line 23, in Claim 1, delete "polymers." and insert -- polymer. --, therefor.

Column 15,
Line 14, in Claim 11, delete "emulisifier." and insert -- emulsifier. --, therefor.

Signed and Sealed this
Third Day of October, 2017

Joseph Matal
Performing the Functions and Duties of the
Under Secretary of Commerce for Intellectual Property and
Director of the United States Patent and Trademark Office

CERTIFICATE OF CORRECTION (continued)
U.S. Pat. No. 9,714,307 B2

Column 16,
Lines 15 & 16, please delete "$F_2C=CFCF_2-O-(CF_2)_p-O-CF_2-(CF_2)_u]_v-COOM$" and insert -- $F_2C=CFCF_2-O-(CF_2)_p-[O-CF_2-(CF_2)_u]_v-COOM$ --, therefor.